BLOOD, HATHAWAY & BEACH.

Grain Bevel.

No. 78,417.

Patented June 2, 1868.

United States Patent Office.

A. R. BLOOD, A. HATHAWAY, AND V. R. BEACH, OF INDEPENDENCE, IOWA.

*Letters Patent No. 78,417, dated June 2, 1868.*

IMPROVEMENT IN CULTIVATOR.

The Schedule referred to in these Letters Patent and making part of the same.

TO ALL WHOM IT MAY CONCERN:

Be it known that we, A. R. BLOOD, A. HATHAWAY, and V. R. BEACH, of Independence, in the county of Buchanan, and State of Iowa, have invented certain new and useful Improvements in Cultivators; and we do hereby declare that the following is a full, clear, and exact description thereof, reference being had to the accompanying drawings, and to the letters of reference marked thereon, which form a part of this specification, in which—

Figure 1:
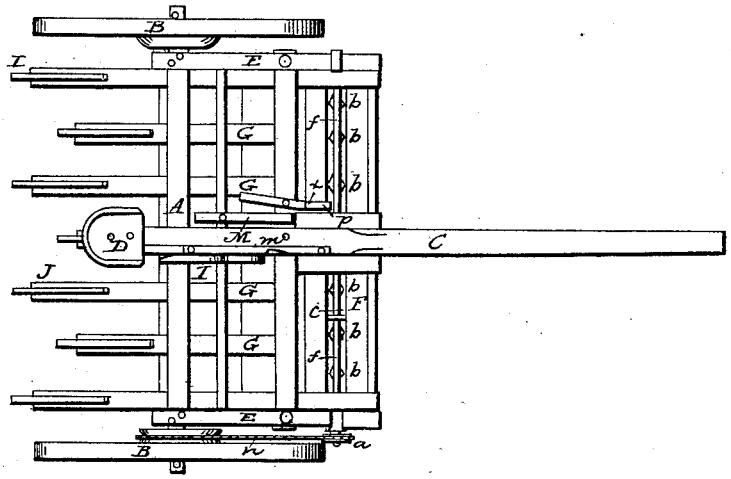
Figure 2:
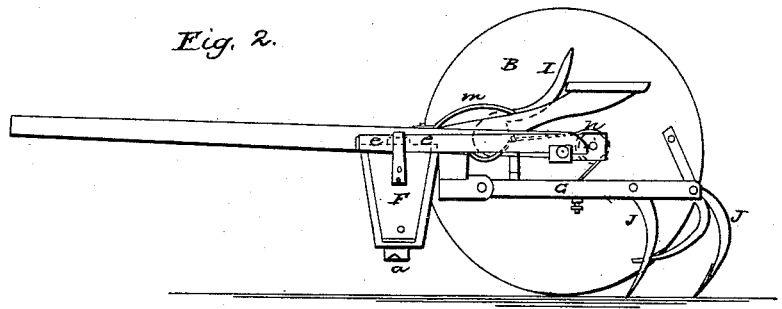

Figure 1 represents a plan of our machine,

Figure 2 a side elevation, with one of the wheels removed, and

Figure 3:
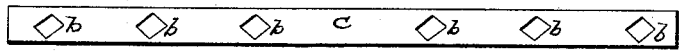

Figure 3 a detached view of the sliding bar or plate, showing the diamond-shaped holes for the disposition of the grain.

To enable others skilled in the art to make and use our invention, we will now describe its construction and operation.

A represents the axle, on which are the wheels B B. C designates the tongue, secured to axle A. Upon said tongue is mounted the driver's seat D. E E represent two arms, fastened at one of their ends to the axle A, and projecting out a suitable distance therefrom. F designates the seed-box, made as seen in fig. 2, and provided with two clips, one on each end. By means of said clips, the seed-box may be slid and held on the outer ends of arms E E. It will also be observed that we secure the seed-box to the under side of the machine, the object of which is to prevent the seed, while being sown, from blowing away. In the bottom of this box we make a series of diamond-shaped holes, $b\ b\ b$, for the purpose of more effectually disposing of the seed. $c$ designates a sliding metal plate, also furnished with holes to correspond with those in the bottom of the seed-box, the office of which will be more apparent hereafter. Secured to the under side of the bottom of the seed-box, directly beneath the holes $b\ b$, is the strip $d$, which is bevelled on its inner side, in order to scatter the seed more thoroughly while being fed. $e\ e$ represent the covers of the seed-box. G G, designate a series of arms or bars, made as seen in fig. 1, and fastened at their inner ends by means of a metal rod passing through them, said rod working in projections or blocks secured to the lower side of a cross-bar of the arms E E. The outer ends of said arms are slotted, for the purpose of receiving the teeth J J J. The treeth J J, it will be observed, are secured in place by means of wooden pins, so that if the teeth while in operation should strike any hard substance, the pins will be easily broken, and the teeth allowed to give way, and thus prevent them from being damaged. M represents a foot-piece, furnished with a bar, which rests on the arms of the teeth J J, and, by means of said foot-piece, the teeth may be pressed down deeper in the ground. I designates a cam-lever, pivoted to the inner end of the tongue, said lever being provided with a cord, which passes over a pulley, $a$, and secured at one end to a cross-bar, attached to the arms of the teeth J J. By means of this lever, the teeth can be raised or lowered when desired. $m$ designates a catch or stop, for holding the lever in place when the teeth are raised. $n$ represents a belt, which passes over a pulley formed on the inner side of one of the wheels B, and over a pulley working on the shaft $f$, passing through the seed-box F. This band communicates motion from the wheels B B to the shaft $f$, and said shaft, while revolving, will loosen the seed, and assist in allowing them to escape. $p$ designates a lever, fastened at its lower end to the sliding plate $c$, and having its fulcrum at $x$. The upper end of this lever is supplied with a handle, by means of which it may be operated, causing the slide $c$ to close or open the holes $b\ b$ in the seed-box.

Having thus described our invention, what we claim as new, and desire to secure by Letters Patent, is—

1. The foot-piece M, arranged as described, for pressing the teeth in the ground, substantially as specified.

2. The seed-box F, furnished with diamond-shaped holes, in combination with slide $c$, likewise furnished with diamond-shaped holes, and arranged to operate as and for the purpose set forth.

3. In combination with the above, we claim the cam-lever I, foot-piece M, and arms G G, to which are secured the teeth J J, all arranged as and for the purpose set forth.

In testimony that we claim the foregoing as our own, we affix our signatures in presence of two witnesses.

A. R. BLOOD,
A. HATHAWAY,
V. R. BEACH.

Witnesses:
D. B. CUTTER,
L. A. MAIN.